(12) United States Patent
Bergsten et al.

(10) Patent No.: US 8,819,432 B2
(45) Date of Patent: Aug. 26, 2014

(54) METHOD FOR AUTHENTICATION AND SIGNATURE OF A USER IN AN APPLICATION SERVICE, USING A MOBILE TELEPHONE AS A SECOND FACTOR IN ADDITION TO AND INDEPENDENTLY OF A FIRST FACTOR

(75) Inventors: Ulrik Bergsten, Saint-Maur des Fosses (FR); Christian Gross, Ableiges (FR); Jacques Thieblemont, Mauguio (FR)

(73) Assignee: Paycool International Ltd., Hong Kong (HK)

( * ) Notice: Subject to any disclaimer, the term of this patent is extended or adjusted under 35 U.S.C. 154(b) by 678 days.

(21) Appl. No.: 12/864,853

(22) PCT Filed: Jan. 27, 2009

(86) PCT No.: PCT/FR2009/000089
§ 371 (c)(1),
(2), (4) Date: Sep. 28, 2010

(87) PCT Pub. No.: WO2009/112693
PCT Pub. Date: Sep. 17, 2009

(65) Prior Publication Data
US 2011/0016320 A1    Jan. 20, 2011

(30) Foreign Application Priority Data
Jan. 28, 2008   (FR) ...................................... 08 00440

(51) Int. Cl.
*H04L 9/32*     (2006.01)
*H04L 29/06*    (2006.01)
*G06F 21/34*    (2013.01)
*G06F 21/40*    (2013.01)

(52) U.S. Cl.
CPC ................ *H04L 63/08* (2013.01); *H04L 63/12* (2013.01); *H04L 63/083* (2013.01); *G06F 21/34* (2013.01); *G06F 21/40* (2013.01); *H04L 9/3226* (2013.01)
USPC ............... 713/170; 713/168; 713/171; 726/5; 380/28; 380/44; 380/282

(58) Field of Classification Search
CPC ....... H04L 63/08; H04L 63/12; H04L 63/083; H04L 63/18; H04L 9/3226; H04L 2463/082; H04L 63/0853; H04L 9/3234; G06F 21/34; G06F 21/40; G06Q 20/3823; H04W 12/06
See application file for complete search history.

(56) References Cited

U.S. PATENT DOCUMENTS

| | | | |
|---|---|---|---|
| 7,690,027 B2 * | 3/2010 | Sandberg | ........................... 726/9 |
| 2002/0133467 A1 | 9/2002 | Hobson et al. | |
| 2004/0044739 A1 | 3/2004 | Ziegler | |
| 2007/0130463 A1 * | 6/2007 | Law et al. | ..................... 713/168 |

FOREIGN PATENT DOCUMENTS

WO    WO 02/19593    *    3/2002

OTHER PUBLICATIONS

International Search Report (PCT/ISA/210) dated Oct. 6, 2009.

* cited by examiner

*Primary Examiner* — Shewaye Gelagay
(74) *Attorney, Agent, or Firm* — Buchanan Ingersoll & Rooney PC (57) ABSTRACT

The invention relates to a method for the two-factor authentication of a user in an application service running on an application server. The first authentication factor is a PIN authentication code known only by the user and the application service, and the second authentication factor is the mobile communication terminal of the user on which is installed a reliability application obtained from a reliable third party or certified by the same. The reliability application is capable of generating, using the PIN authentication code and a secret key shared only with the reliable third party, a single use authentication code for each authentication of the user in the application service.

15 Claims, 5 Drawing Sheets

METHOD FOR AUTHENTICATION AND SIGNATURE OF A USER IN AN APPLICATION SERVICE, USING A MOBILE TELEPHONE AS A SECOND FACTOR IN ADDITION TO AND INDEPENDENTLY OF A FIRST FACTOR

FIELD OF THE INVENTION

The present invention concerns a method for using a mobile telephone for authenticating a user strongly with an application service and for digitally signing a transaction with this application service.

In the remainder of this description the example will be taken of the case where the application service is a remote banking service but it must be clearly understood that this example is absolutely not limitative and that any other application service accessed by a user can be protected by means of the method according to the invention.

BACKGROUND OF THE INVENTION

In the prior art, the authentication of a user with an application service is done by means of a single authentication factor, typically consisting of password (or a PIN code) allocated by the application service to the user after he is registered with the service. At this stage, the user can therefore authenticate himself with the application service by providing his user identifier and his password code.

Therefore communication of the password to the application service is supposed to demonstrate that this is indeed the legitimate user.

However, it is known that this remains weak authentication for several reasons:

the password is necessarily sufficiently short for the user to be able to memorise it, if in addition the user is free to chose the password himself, it is known that he often makes a simplistic choice, that is to say one that is relatively easy to guess, finally, such an authentication method is vulnerable to attacks by means of spyware (spy software installed unknown to the user on his workstation and which captures the password at source when the user enters it) or to attacks of the phishing type, where the user believes that he is communicating his password to the legitimate application service whereas he has in reality been put in contact with a hostile or compromised service, finally, if the password were to be compromised in one way or another, it is not obvious that the user will perceive this in time to prevent fraud or even repeated frauds.

Hence the well known idea of using in addition to a first authentication factor, the password, a second authentication factor supposed to demonstrate that a hardware device in the possession of the user is actually participating in each authentication or signature transaction. In this context, the password is often a decimal number, typically from 4 to 8 digits, and it is then called a PIN.

The user is thus capable of guarding against any risk of usurpation of his identity by perceiving that he is no longer in possession of the hardware device in question. He will then be able to block his identifier.

It can be seen that the choice of the type of hardware device is not indifferent with regard to the level of security achieved: ideally, the device must be used frequently and the user must part with it as infrequently as possible.

With the level of mobile telephony equipment reached at the present time, one aspect of the invention makes provision for making the mobile telephone of the user this device constituting the second authentication factor.

However, this does not suffice: it is also necessary to move from a static authentication where it is the same authentication data that serves on each occasion to dynamic authentication where the authentication data can be used only once.

The question here is knowing how to generate such a dynamic authenticator and how this demonstrates the actual involvement of the mobile telephone of the user.

The prior art shows that it is necessary to provide a secret particular to each mobile telephone and an application for managing the dynamic authentications, after the PIN is entered, by using the secret and a diversification data item, typically a clock, a counter or a challenge coming from the application service.

This does however raise several questions that do not yet appear to have found a global response:

what should be done to be in a position to resist improper disputes of users (non-repudiation)?

how can the users reasonably have confidence in the application mentioned and how is it installed on the mobile telephones of the users?

where does the secret mentioned come from and how is it protected?

Moreover, it is interesting to see to what extent it is possible to build a signature solution from a simple authentication solution. In fact, the problem of the signature is broken down into two parts:

is one certain that the signature emanates from the supposed user?

how to give expression to the agreement of the user in linking it to the terms of the signed transaction?

The first part comes down to the authentication of the user by the application service that will have to deal with the transaction.

The prior art shows that, in order to deal with the second part, it is necessary to present the terms of the transaction to the user and to obtain a response on his part, the agreement or the signature, which will have to depend on these terms and on the process of his authentication. This functional requirement is referred to in English as "what you sign is what you see". In other words, it could be said a signature is a contextual authenticator.

SUMMARY OF THE INVENTION

One aim of the present invention is consequently to propose an authentication and signature method capable of responding to the entire problem described above and thus to significantly increase the security of transactions compared with the mechanisms known in the prior art.

The principle of the invention consists not only on using the mobile telephone of the user to use a second authentication factor of a user with an application service but also to use a reliability application loaded by a reliable third party on the mobile telephone of the user or a SIM card inserted in the mobile telephone of the user. This will result in a strong authentication of the user and will also make it possible in a secure fashion to sign the transactions made by this user.

The complete description of the method will show that the sharing of responsibility provided between the application service on the one hand and the reliable third party on the other hand makes it possible to comply with the requirement for non-repudiation, no party concerned being in a position to be "judge and judged":

each application service is responsible for the identity of the user ("know your customer"), allocates an identifier and a PIN, this PIN constituting the first authentication factor within the meaning of the present invention and records with the reliable third party the mobile number of the user, in accordance with the declaration by the latter, the reliable third party manages the second authentication factor and in this regard is responsible for the reliability application.

It is true that the requirement for non-repudiation is even stronger in the case of the signature of a transaction by a user than in the case of a simple authentication thereof. It will be seen that this signature method of the present invention actually complies with this increased requirement by preventing the generation of a valid signature in the case of "donation" of the reliability application and of the secret particular to the mobile telephone of the user, that is to say in the case of reproduction by copying of these elements in another mobile telephone.

Naturally, in order to implement the principle of the invention, it will be necessary to adapt the mobile telephone and in particular its internal software, and to provide the server executing the application service with specific complementary software, the writing of which using the method described here will be within the capability of a person skilled in the art.

The invention consequently concerns an authentication method and a signature method as defined in the claims, which are incorporated here by reference.

In detail, the invention concerns in particular a method for the two-factor authentication of a user with an application service executed on an application server, characterised in that the first authentication factor is a PIN authentication code known solely to the user and the application service, and in that the second authentication factor is the mobile communication terminal of the user on which a reliability application obtained from a reliable third party or certified by him has been installed, the said reliability application being able to generate, by means of the said PIN authentication code and a secret key shared only with the reliable third party, a single-use authentication code OTP for each authentication of the user with the application service.

By virtue of the means used in this authentication method, it is then possible to authenticate a user strongly with an application service, by proceeding in accordance with the following steps:
following the entry of his PIN authentication code by the user, a step of generating a single-use authentication code OTP by means of the reliability application installed on the mobile communication terminal of the user;
a step of communicating the single-use authentication code OTP thus obtained to the application service;
a step of transmission by the application service of the single-use authentication code in a reduced form to the reliable third party;
a step of verifying the single-use authentication code OTP by the reliable third party;
a step of notification of the result of the authentication by the reliable third party to the application service.

According to a first variant of the method, the first authentication factor, namely the PIN authentication code, is supplied to the user by the application service in a secure manner. However, it is also possible to for the PIN authentication code to be chosen by the user and communicated to the application service in a secure manner.

In a similar fashion, the secret key can be created by the reliable third party and communicated in a secure manner to the reliability application, but it is also possible for it to be generated by the reliability application itself and communicated to the reliable third party in a secure manner.

According to the invention, the reliability application is obtained from a reliable third party or certified by him, and is installed on the mobile communication terminal of the user prior to any authentication of the user.

According to one aspect of the invention, the secret key is shared only with the reliability application that is executed on the mobile communication terminal, and with the reliable third party, but is not accessible to the application service, which guarantees independence between the two authenticity factors used.

The single-use authentication code OTP is a single code for each transaction, generated dynamically by the reliability application and then communicated by the user to the application service, without being communicated to the reliable third party. It is generated by the reliability application after entry by the user of the PIN authentication code on the mobile communication terminal.

Before using the authentication method in concrete transactions of authentication of a user, it is necessary to register this user with the reliable third party. This registration step is broken down as follows:
registering the user with the server of the reliable third party;
downloading and installing the reliability application in the mobile communication terminal;
finally, activating the said reliability application in order to make it functional for the subsequent operations of authentication of the user with the application server.

In more detail, the phases ranging from the registration of the user to the activation can be implemented via an application service and then comprise the following steps:
a step of declaring his mobile number by the user with the application service;
a step consisting of requesting by the application service the registration of the user with a reliable third party by communicating to him the mobile number of the user;
a step of allocation to the user by the reliable third party of an authenticity code followed by a step of sending this authenticity code to the application service;
a step of communicating the authenticity code to the user by the application service;
a step of sending by the reliable third party of a message of the SMS type to the user, the said message of the SMS type containing the parameters for loading and installing the reliability application on the mobile communication terminal;
a step of loading and installing the reliability application on the mobile communication terminal of the user;
a step of activating the reliability application after verification of the authenticity code;
a step of generation of a secret key by the reliability application;
a step of secure transmission of the secret key and of the said parameters to the server of the reliable third party;
a step of verification of the elements received by the reliable third party and initialisation of the registers of the user;
a step of sending by the reliable third party of a message of confirmation of activation to the reliability application.

However, the phases ranging from the registration of the user to activation may also be performed directly with a reliable third party, and then comprise the following steps:

a step of registering the user with the reliable third party;

a step of declaration, by the user, of his mobile number to the reliable third party and validation thereof;

a step of communication of an authenticity code to the user by the reliable third party;

a step of sending of a message of the SMS type by the reliable third party to the user containing the parameters enabling him to load and install the reliability application on his mobile communication terminal;

a step of loading and installing the reliability application on the mobile communication terminal of the user;

a step of activation of the reliability application after verification of the authenticity code;

a step of generation of a secret key by the reliability application;

a step of secure transmission of the secret key and of the said parameters to the server of the reliable third party;

a step of verification of the elements receiving by the reliable third party and initialisation of the registers of the user;

a step of sending an activation confirmation message to the reliability application by the reliable third party.

According to a first embodiment of the invention, the reliability application is loaded and installed in a memory of the mobile communication terminal, so as to make it executable by a microprocessor of the mobile communication terminal.

In a variant, the reliability application is loaded and installed in a memory of the SIM card, so as to make it executable by the microprocessor of the SIM card or of the mobile communication terminal.

The invention also concerns a method for signature of a transaction between an application server and a user previously registered and authenticated with the said application server. This signature method comprises the following steps:

a step consisting of preparing at the application server a "good for execution" (GFE) representing the transaction to be signed, followed by the transmission of the "good for execution" and the mobile number of the user to the server of the reliable third party;

a step consisting of generating, at the server of the reliable third party, a random challenge and then a step consisting of preparing and sending the "good for execution" and the challenge to the mobile communication terminal of the user;

after acceptance of the "good for execution" by the user and entry of his PIN code, a step consisting of calculating, at the reliability application, a response (R4) to the sending of the "good for execution" by the reliable third party;

after entry of the response (R4) by the user on the application service, calculation by the application server of a reduced response (Resp_r);

transmission of the mobile number and of the previously calculated reduced response by the application server to the server of the reliable third party;

at the server of the reliable third party, calculation of a result (R6) and, according to the value of the said result (R6), indicating to the application server whether or not the user has validly signed the "good for execution".

It should be noted that the previous authentication step of the user for implementing this signature method may be the authentication with two independent factors in accordance with the present invention, or another type of authentication.

BRIEF DESCRIPTION OF THE DRAWINGS

The invention will be better understood with reference to the following description and the figures, in which.

DETAILED DESCRIPTION OF THE INVENTION

Before describing the invention in more detail, it is useful to define a certain number of terms used in the remainder of the description.

Application service: service wishing to use the present invention for authenticating its users strongly. It may in particular be a case of an online banking service, for example by means of the internet and/or via other channels. This application service is executed on a server that hosts the application, and to which the users connect.

PIN, standing "Personal Identification Number": this is a code for authentication with an application service and that is particular to each user. It is therefore a secret, known only to the user and the application service, and constitutes the first of the two strong authentication factors of the present solution. This PIN code is managed entirely by the application service rather than by the reliable third party.

User identifier: identifier of the user with an application service. It is typically a string of alphanumeric characters.

Mobile number: number by means of which the mobile communication terminal or mobile of the user is identified uniquely on the mobile telephony networks (more precisely, the mobile number is linked to one and only one SIM card; when the latter is inserted in a mobile, the latter may be joined by means of the mobile number, by an incoming call or an SMS for example). This number also serves as an identifier of the user with the reliable third party. It is typically his telephone number when the mobile communication terminal is a mobile telephone.

Mobile communication terminal, or mobile: within the meaning of the present patent application, mobile communication terminal or mobile means any portable electronic apparatus having at least one microprocessor, a memory and a display device and able to connect to a wireless digital telephony network, in particular of the GSM, CDMA, UMTS or other type, and accessible via a mobile number. In practice, it will usually be a mobile telephony terminal having code execution capabilities of the Java type, and data communication capabilities. As will be clear hereinafter, the mobile equipped with the reliability application and a secrete key constitutes the second strong authentication factor according to the present solution.

Reliability application: this is an application, typically of the Java type, installed on the mobile or on the SIM card thereof, and which enables the user to be authenticated and/or sign a transaction according to the present solution. It should be noted that this reliability application requires a secret key that is stored on the mobile and is accessible only to the reliability application.

Secret key: this is a strong secret generated randomly on the mobile and transmitted in a secure fashion to the reliable third party. It will be seen that, at the end of the process of installing and activating the reliability application on the mobile, the reliability application and reliable third party share this same strong secret. It should be noted that this strong secret could be generated by the reliable third party and transmitted to the reliability application in a secure fashion. It should also be noted that the term "strong" means that the entropy of the secret is sufficient to resist any attack by brute force (which is not the case with a weak secret, such as a conventional password).

Reliable third party: service managing the registered mobiles and in this regard managing in particular the method of installing and activating the reliability application and contributing to the verification of the OTPs (standing for "One Time Password") and the signatures confirming in particular the involvement of the second factor that is the mobile. The reliable third party is an entity independent of the one offering the application service.

SMS (standing for "Short Message Service"): short message sent to the mobile identified by the mobile number. The security of the mobile digital telephone network (a network of the closed type), guaranteed by the operators, guarantees that only the mobile provided with a SIM card linked to the mobile number for which the SMS is intended will receive the message.

SMS of the WAP push type: specific SMS containing a descriptive message and a downloading URL. When such an SMS is received, the mobile displays a request intended for the user inviting him to download the resource (for example a game or any application) on his mobile.

Withdrawal identifier or withdrawal ID: technical identifier, temporary alias of the mobile number, indicated as a parameter of the URL sent to the mobile via a message of the SMS or WAP push SMS type.

Activation of the reliability application: this is a phase subsequent to the downloading and installation of the reliability application on the mobile communication terminal and which terminates the process of installation and activation of the reliability application when it is first executed on the mobile. During this activation, a secret key (Ks) is generated by the reliability application, stored locally in the mobile, and transmitted in a secure manner to the reliable third party. Alternatively the secret key (Ks) can be received in a secure manner from the reliable third party and installed in the reliability application.

Authenticity code: differentiating element, the purpose of which is to give the means to the user to verify that the reliability application installed actually comes from the reliable third party. This code is supplied to the user at the time of the declaration of the mobile number to the reliable third party by the user, and is displayed when the reliability application is activated. If this code does not match or is absent, the user has the responsibility not to use the reliability application and to contact the application server since there is a suspicion of fraud.

OTP or "One Time Password": dynamic authenticator or code generated dynamically by the reliability application of the present solution after the user enters his PIN on the mobile. This OTP code is unique for each authentication and must be communicated by the user in order to authenticate himself with the application service.

HMAC: a message authentication code (MAC), for example the HMAC-SHA1 algorithm, but any other secure MAC calculation algorithm may also be suitable. The notation C=HMAC(M, K) designates the authentication code of the message M, generated by means of the key K. This code C can be generated from M only if the key K is known, and this therefore guarantees both the integrity of M and the authenticity thereof. Conversely, it is not possible to go back to the key K knowing M and C.

Counter: internal variable, stored in the mobile (counter_mobile) and in the reliable third party server (counter_base) and making it possible to diversify the OTPs generated. When an OTP is generated, the value of the counter of the mobile is incremented and when it is validated the value of the counter is updated on the reliable third party.

Challenge: code generated randomly by the reliable third party during the signature process. As will be seen subsequently, the challenge is sent with the "good for execution" or GFE to the reliability application by means of a message of the SMS type. It makes it possible to avoid the replay of the signatures, but it also fulfils the role of a temporary secret since even an attacker who has succeeded in stealing the two authentication factors will in addition need the challenge in order to be able to generate a valid response.

Response: response calculated by the reliability application from the GFE, the PIN, the secret key and the challenge. The supply of a correct response by the mobile proves the use of the two authentication factors, in the presence of the GFE, and therefore manifests the consent of the user to the content of the GFE. Note that the response is not replayable, since the challenge makes it possible to diversify the responses.

Good for execution or GFE: all the data on which the application service requests the user to give an undertaking during the signature process. The GFE can, according to circumstances, be sent directly to the user using a message of the SMS type, or can be recovered directly on a server by the reliability application using a URL recovered from the SMS sent by the application service. Where the GFE is presented to the user by means of an SMS, it will be limited in size.

DETAILED DESCRIPTION OF THE SOLUTION PROPOSED BY THE INVENTION

The method according to the invention will now be described in more detail with reference to the figures. The global method comprises several methods, namely a process of prior registration of the user (FIG. 1) so that he can use the invention, and use processes that make it possible to authenticate the user (FIG. 2) and then to sign transactions with the application service (FIG. 3).

The global method also comprises a process of re-registration (FIG. 4) with the application service, in the case where a previous registration has been cancelled, and a deregistration process (FIG. 5) when the user no longer wishes to use his mobile to make transactions with the application service.

Figure 1:
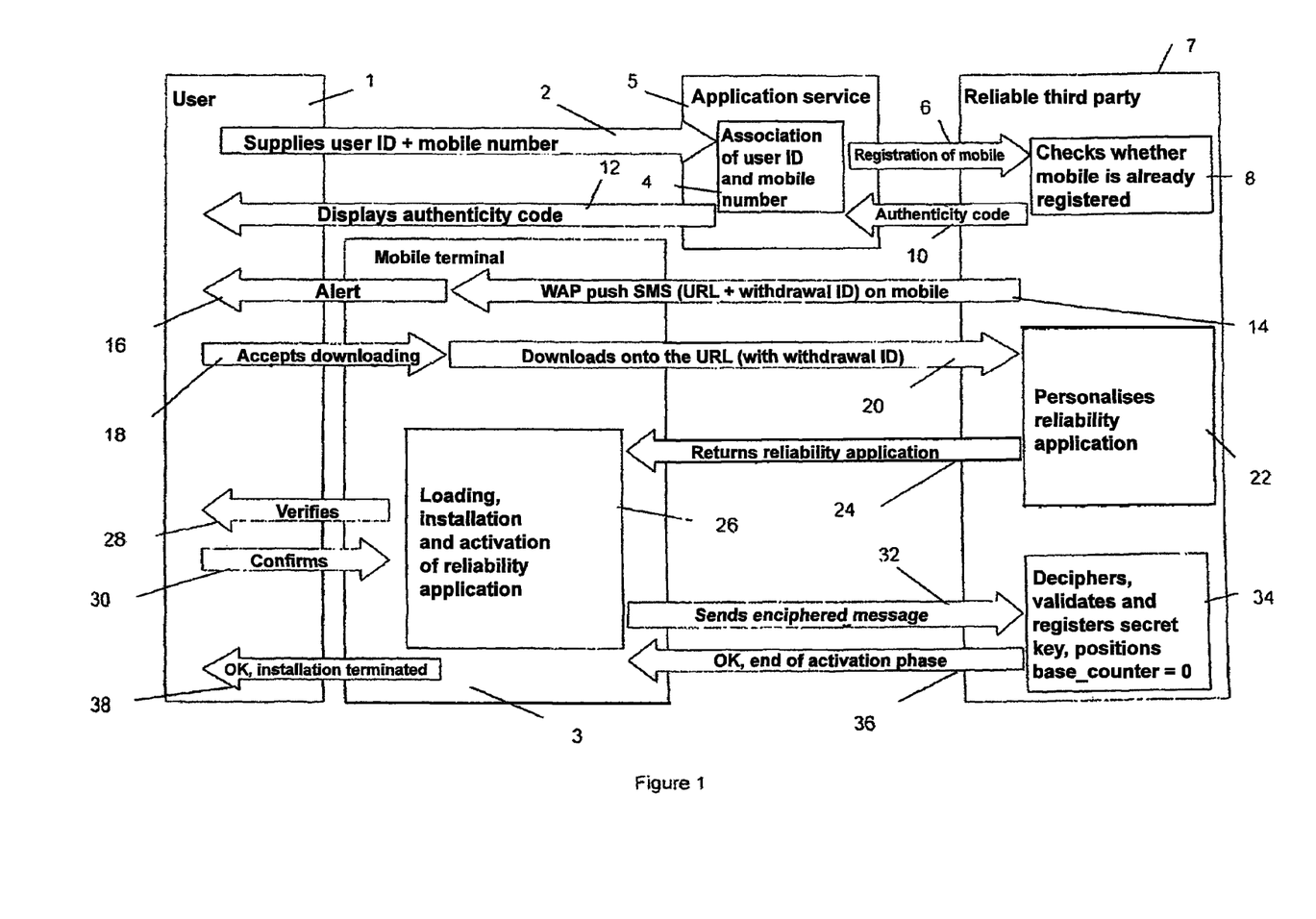
FIG. 1 shows a flow diagram of the method of registering a user and his mobile communication terminal with the application service.

Reference is made to FIG. 1 to describe the process of registration of the user with the application service. This registration process comprises a phase of registration of the mobile with the application service, a phase of installation of a reliability application on the mobile, and a phase of activation of the reliability application.

Registration Process: Phase of Registration of the Mobile:

It is assumed that each user is already registered with an application server that has allocated to him a user identifier and a PIN, as is the case in the authentication methods normally used at the present time.

At this stage, the user will be able to authenticate himself with the application server by providing his user identifier and his PIN. However, this is weak authentication, based on a single factor, the PIN.

To supplement this first factor, a secret known solely to the user, through a second factor, based on a hardware device in the possession of the user, the registration method provides for the user to formally declare his mobile number to the application server 5.

This declaration will enable the application server to associate the mobile with the user, in a step indicated by the reference 4. The application server 5 does not necessarily have the means for ensuring the user is indeed the proprietor of the mobile number declared, and consequently the user is responsible for his declaration. This is why provision is preferably made for the user to sign this declaration online, by means of a sufficiently reliable electronic signature, or in a traditional fashion (letter or form signed face to face).

On the basis of this declaration, the application server registers (step 6) the declared mobile with the reliable third party.

In the step denoted 8, the server of the reliable third party checks whether the mobile is already registered and activated in its database. If the mobile is not already activated, the reliable third party allocates an authenticity code that is transmitted (step 10) to the application service and triggers the phase of installation of the reliability application on the mobile, which will itself be followed by the phase of activating the reliability application.

The application server 5 confirms with the user that his declaration has been taken into account and communicates the authenticity code to the user warning him that he will receive a message of the SMS type on his mobile, for example an SMS of the WAP push type enabling him to store a reliability application on his mobile, which will display this authenticity code at first execution. If the application once installed does not display the mobile number of the user and the authenticity code announced, the user will be responsible for not proceeding with the activation.

Registration Process: Phase of Installation of the Reliability Application

Following the registration of the mobile number by the application server, the reliable third party 7 sends an SMS of the WAP push type or other (step 14 in FIG. 1) intended for the newly registered mobile. The SMS contains in particular a URL comprising a withdrawal ID, a temporary and confidential alias of the mobile number of the user, for single usage.

Through the arrival of this SMS, the user is invited, by means of an alert (step 16), to download the reliability application to the URL conveyed by the SMS.

When the agreement of the user is received (18), the mobile communication terminal sends (20) a message agreeing to download the reliability application to the server of the reliable third party.

The reliable third party requested by this URL by the mobile (step 22):
  recovers the withdrawal ID and verifies that an activation is indeed underway for the corresponding mobile;
  dynamically generates a personalised and preferably signed version of the reliability application comprising the mobile number, the withdrawal ID and the authenticity code. The personalised version of the reliability application also possibly depends on the type of mobile.

Once downloaded onto the mobile (step 24), the reliability application is then installed in the mobile (step 26) after verification of the integrity and signature of the code constituting this reliability application.

If the application were already installed, it is necessary to reinstall it by purging all the data previously created locally in the mobile by this application.

So that the reliability application can be signed and the operating system of the mobile correctly takes account of this, it is preferable to be based at a minimum on the MIDP 2.0 standard or equivalent.

Registration Method: Phase of Activating the Reliability Application:

Activation occurs at the first execution of the reliability application and serves to generate a secret key Ks which will be communicated in a secure manner to the reliable third party and stored locally in the mobile (3) with a counter at the mobile level (denoted counter_mobile) initialised to 0.

Activation of the reliability application assumes an intentional and therefore responsible act by the user: to proceed with activation, he will for example have to enter the authenticity code, which has the merit of obliging him to actively take cognisance thereof, which assists his vigilance.

Thus, at the time of first execution, the reliability application indicates that this is the activation phase, displays the mobile number and the authenticity code and invites the user (step 28) to proceed with confirmation of the activation while entering the authenticity code (step 30) if the data displayed on the mobile are compliant, namely:
  it is actually the mobile number that he declared to the application server (step 4);
  it is indeed the expected authenticity code (step 12).

If such is not the case, the user is invited not to proceed with activation and to indicate this abnormality or attempt at fraud to the application server.

When the entry (step 30) made by the user corresponds to the authenticity code, the reliability application draws a random variable that will serve as a secret key Ks for the subsequent authentication and/or signature operations, as will be described below. This secret key must be communicated in a secure fashion to the reliable third party.

For this purpose, the reliability application:
  forms a message containing the withdrawal ID, the authenticity code, the secret key and optional padding,
  enciphers this message with the public key of the reliable third party, this information being hard coded in the reliability application,
  and posts or communicates by another means the enciphered message thus obtained to the reliable third party (step 32).

On reception of the enciphered message (or enciphered block), the reliable third party (step 34):
  deciphers the message received by means of its private key, so as to extract the secret key Ks generated in the mobile, and to share this same secret key between the mobile and the server of the reliable third party;
  verifies that the withdrawal ID does indeed correspond to a mobile being activated;
  verifies the authenticity code extracted from the deciphered message;
  initialises to 0 a counter, denoted base_counter, at the server of the reliable third party;
  recovers and stores the secret key Ks and the base_counter in the event of positive verifications;
  responds where applicable positively to the reliability application (step 36), by transmitting to the mobile communication terminal a message of correct completion of the activation of the reliability application.

In the case of a positive response, the reliability application stores locally in the mobile the secret key and the mobile_counter initialised to 0. Finally, the user is informed (step 38) that the reliability application is activated and that the authentication service is now open.

Authentication Process

Figure 2:
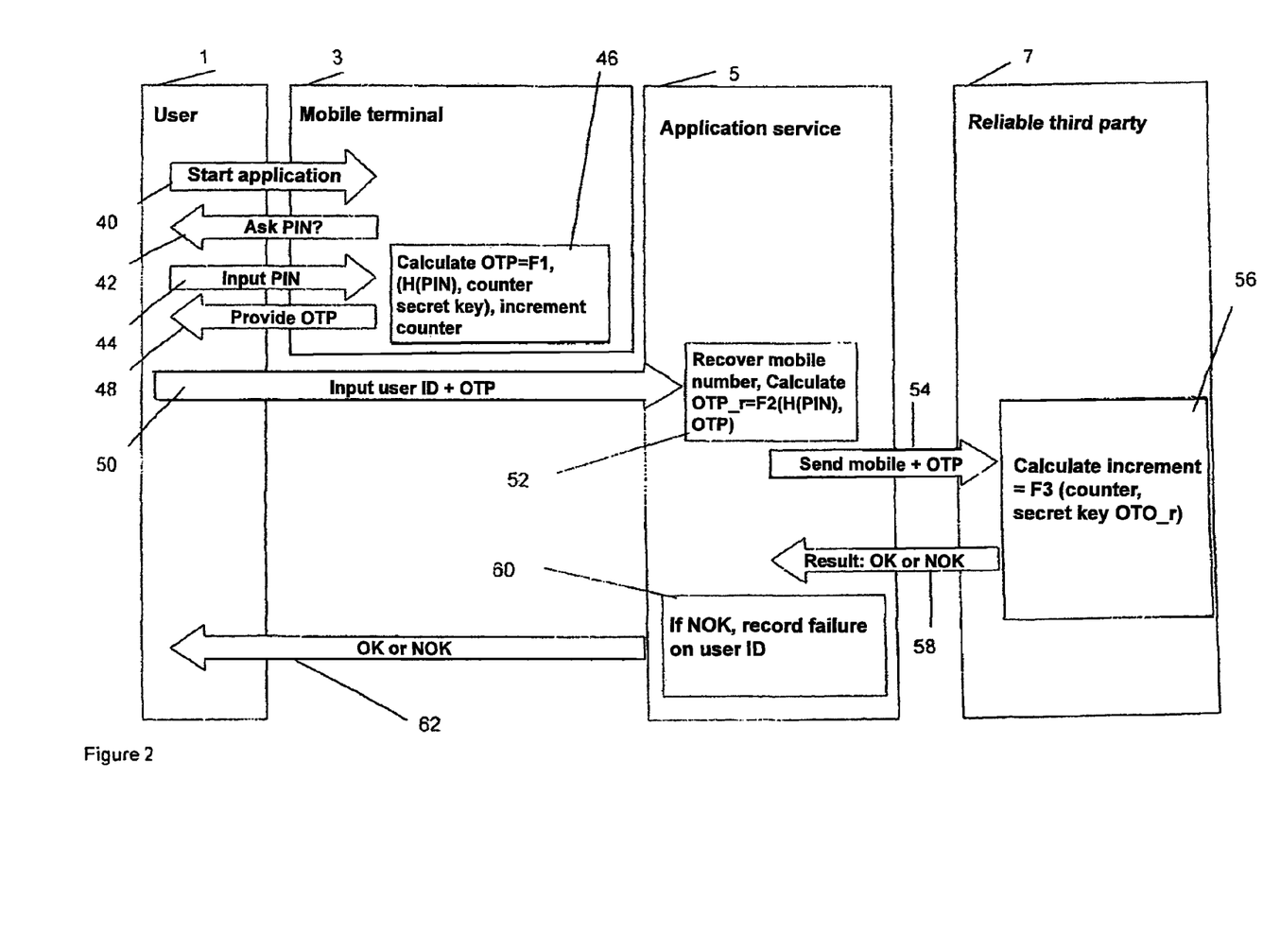
FIG. 2 shows a flow diagram of the method of authenticating a user previously registered with the application service, using a reliable third party and the mobile communication terminal of the user according to the invention.
Figure 3:
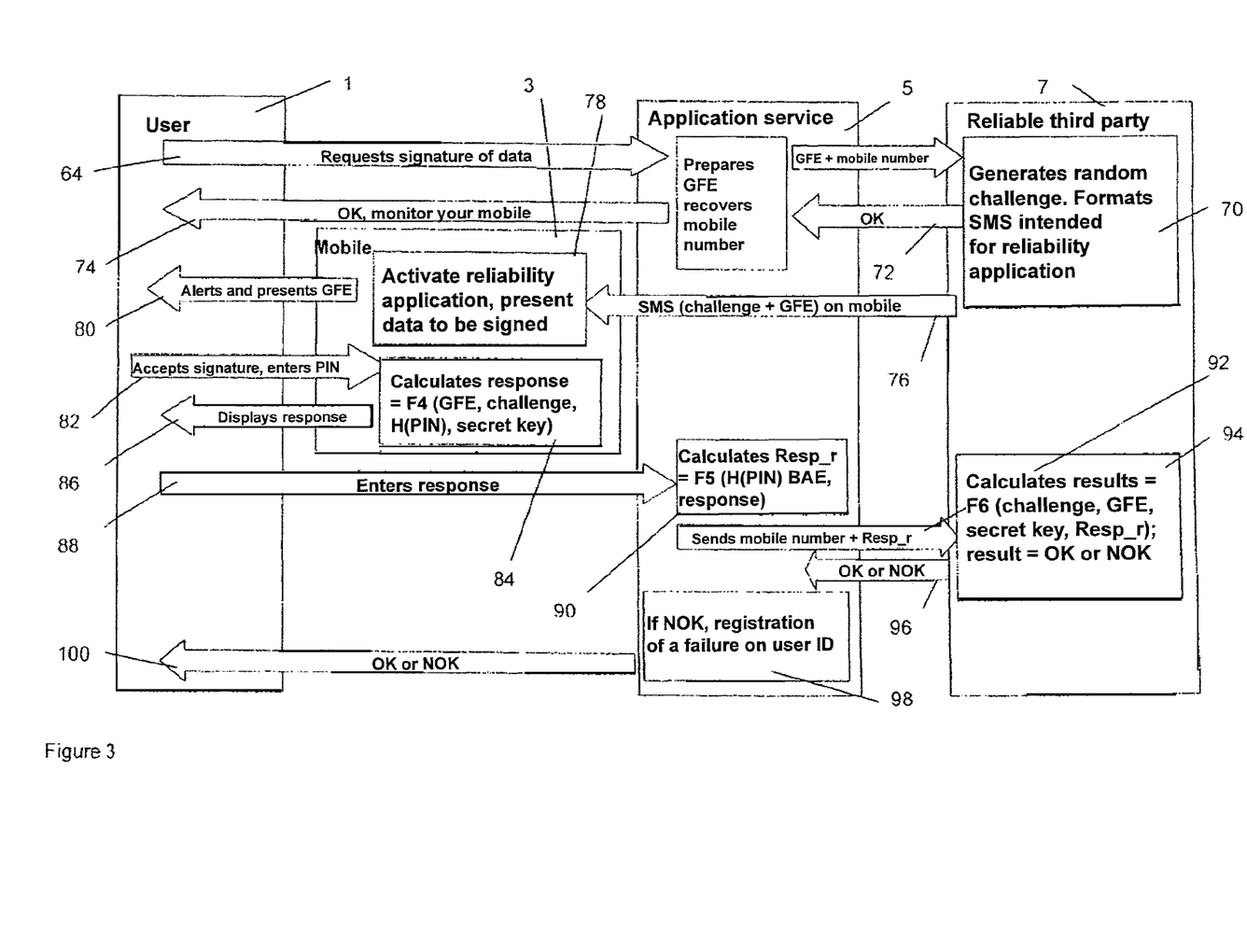
FIG. 3 shows a flow diagram of a signature method according to the invention.

Reference is made to FIG. 2 to describe the phase of use of the authentication process according to the invention, the activation of the reliability application already having been done.

The user of the mobile 3 wishes to be authenticated with an application service 5 for which he knows his user identifier and his PIN.

Taking account of the fact that the application services do not always store the PIN in clear in a database, even protected, we introduce below a function H that gives the stored value instead of the PIN from the PIN (and optionally other data known to the application service, but they will not be detailed in order not to unnecessarily burden the text). Typically H is a hash function (and hence the notation), and it is in fact desirable not to be able to effect the reverse function easily, but H can also be the identity function if the application server can access the PIN of the user in clear in its database (identity function means that $H(x)=x$). Hereinafter, PIN designates the value of the PIN as entered by the user, H(PIN) designates the result of the function H applied to PIN and HPIN represents the value substituted for the PIN as stored by the application service (unless there is an error on entry, HPIN should have the same value as H(PIN)).

The user launches (step 40) the reliability application on his mobile, which requests of him his PIN code (step 42), and in response the user enters his PIN (step 44).

The reliability application, in the step referenced 46:
calculates an OTP according to a function F1 taking into account (mobile_counter, H(PIN), secret key Ks)
increments the mobile_counter
and displays the OTP (step 48) on the screen of the mobile.

The user enters (step 50) the user identifier and the OTP on the application service, by means of the user interface of the application service, which may be an interface of the internet connection type, a voice server, or any other suitable interface.

On the basis of the user identifier, already stored in its database (step 4), the application service determines (step 52) the mobile number and HPIN.

Then the application service calculates a reduced OTP, denoted OTP_r=F2(HPIN, OTP), which is therefore obtained according to a function F2 applied to HPIN and to the OTP as transmitted by the user in step 50.

The application service then submits (step 54) the mobile number and the OTP_r to the server of the reliable third party.

With respect to the mobile number previously registered (step 6, FIG. 1), the reliable third party determines the value of the base_counter. In addition, it finds the secret key Ks again, registered at step 34, FIG. 1.

Next (step 56), the reliable third part:
calculates an increment value, equal to the result of a function F3 applied to (base_counter, secrete key Ks, OTP_r)
increments base_counter by the increment value, and
returns (step 58) to the application service a message "OK" if increment>0, meaning that the user has indeed been authenticated both by his PIN and by the OTP generated in the mobile and transmitted in reduced form to the reliable third party. In the contrary case, a message "not OK", or NOK, is transmitted to the application service, which relays this message OK or NOK to the user (step 62).

An example of an embodiment of functions F1, F2 and F3
An OTP is calculated from two elements:
an indicator, denoted Ind
and a discriminator, denoted Dis.

The indicator is an integer number strictly smaller than a parameter maxInd and in fact equal to mobile_counter modulo maxInd.

If a user draws at least one number maxInd of OTPs without validating positively with the reliable third party then the counter thereof, base_counter, is desynchronised with respect to the counter, mobile_counter of the reliability application: no new OTP will be able to be validated without the counter of the reliable third party having first been resynchronised with respect that of the reliability application.

The discriminator is the discriminating part of the OTP, that is to say the part that it is impossible to generate without knowing the counter, the PIN and the secret key Ks.

Ultimately, $OTP=Ind+maxInd*Dis$

In the variant described below, based on a basic (but sufficient) "enciphering" by XOR (the exclusive OR), it is necessary for the discriminator to be able to take all the possible values of an integer number in N bits.

Example: if it is wished for the OTPs to be contained within 7 decimal figures, it may be judicious to reserve 18 bits for the discriminator:
  maxInd will then be 38 (beyond this, there is a risk that an OTP generated may not be contained within 7 decimal figures and below, and the entire capacity of the present solution is not used optimally)
  maxDis, the maximum value of the discriminator, will be 262144 (that is to say 2 to the power of 18).

Function F1: F1 (mobile_counter, H(PIN), secret key):
Ind=mobile_counter modulo maxInd
Two messages M1, M2 are calculated such that:
M1=HMAC(Ind, H(PIN)
M2:=HMAC(mobile_counter, secret key)
Then M'1 and M'2 are calculated, defined by:
M'1=M1 modulo maxDis
M'2=M2 modulo maxDis
Which has the effect of shortening the length of M1, M2;
And M3=M'1 XOR M'2 is calculated
Then the function returns Ind+M3*maxInd Function F2: F2 (HPIN, OTP):
Ind=OTP modulo maxInd
A3=OTP/maxInd
A1=HMAC(Ind, HPIN) is calculated
Then A'1=A1 modulo maxDis
And A4=A3 XOR A'1
Next return Ind+A4*maxInd Function F3: F3 (Base_Counter, Secret Key, OTP_r):
Ind=OTP)_r modulo maxInd
T4=OTP_r/maxInd
An increment=Ind−(base_counter modulo maxInd) is calculated
If increment<=0 then increment=increment+maxInd
T2=HMAC(base_counter+increment, secret key) is calculated
And T'2=T2 modulo maxDis
If T'2≠T4 then increment=0
Return increment.

Signature Process

Reference is made to FIG. 3 to describe the signature process according to the invention.

Let us assume that the user of the mobile wishes to validate a set of data generated by the application service and makes a signature request (step 64) to the application service. These data can in particular be a payment order or a contract. The two-factor authentication mentioned in the previous section demonstrates that the user is indeed present reliably, but it is not possible to demonstrate that the user has displayed and validated one or more particular data items; this is the purpose of the signature process. To implement the signature process, the starting point is the principle that activation of the mobile of the user has already been done previously.

In addition, throughout the signature process, the user is considered to be already correctly authenticated on the application service (by the authentication process of the present solution or by another authentication process, or even by a simple identification without authentication), and it is assumed that he wishes to validate a set of data.

In the step referenced 66, the application service prepares all the data to be validated according to the elements that he knows (for example identity, user address, account number, rate, tariff, etc) and elements that he requests of the user (amount, duration, etc) and derives from this a good for execution (GFE) comprising the essential data on which the user is requested to commit himself. It will also be possible to include in this GFE a hash of the original document containing all the data.

The application service transmits to the reliable third party the GFE and the mobile number of the user (step 68).

The reliable third party determines (step 70) a random data item called the challenge. He sends to the reliability application an SMS (Step 76) containing the GFE and the challenge or communicates to the reliability application the elements that will enable him to recover the GFE and the challenge. Once the GFE has been presented to the user (step 80), he is asked whether or not he wishes to sign it.

He may chose not to sign the GFE, or he may chose to sign it.

In the latter case, the user enters the PIN (step 82) and the reliability application, in step 84:
calculates response=F4 (GFE, challenge, H(PIN), secret key Ks),
and displays response for the user.

The user enters response on the application service (step 88). The application service determines the GFE and HPIN with respect to the user identifier and his current validation request.

The application service calculates (step 90) a reduced response, such that: Resp_r=F5 (GFE, response, HPIN).

In step 92, the application service submits a mobile number and Resp_r to the reliable third party.

With respect to the previously registered mobile number (step 4, FIG. 1), the reliable third party determines the challenge and the secret key Ks.

The reliable third party (step 94):
calculates result=F6 (challenge, Resp_r, secret key Ks),
returns result to the application service,
deletes the challenge in the case of a positive result.

In the case of a negative result, a signature failure is registered with regard to the identifier of the user and it will be possible to provide a blocking of any signature after 3 failures for example.

Note that the result is a Boolean, which indicates whether or not the validation is correct. Thus a correct validation indicates:
that the correct PIN code of the user has indeed been entered,
AND that the secret key Ks of the reliability application installed on the mobile has indeed been used,
AND that the challenge sent to the mobile has indeed been used,
AND that all these elements are linked to the GFE.

Starting from this result, the application service can consider that there has indeed been an effective and explicit intent on the part of the user to validate the content of the GFE and to manifest his consent to the content thereof.

Example Embodiment of Functions F4, F5 and F6

Unlike the OTP generation functions, there is this time the use of a challenge/response mechanism, and this does not involve the concept of counter.

The only parameter is therefore the maximum response value, which is an integer number strictly smaller than a parameter maxResp.

Example: if it is wished for the response to be contained within 6 decimal figures, maxResp is equal to 1000000.

Function F4: F4 (GFE, challenge, H(PIN), secret key):
M1, M2 are calculated such that:
M1=HMAC(BAE, H(PIN))
M2=HMAC(challenge+GFE, secret key)
Then M'1, M'2 are calculated such that:
M'1=M1 modulo maxResp
M'2=M2 modulo maxResp
Return M'1 XOR M'2
Function F5: F5 (GFE, response, HPIN):
A1=HMAC(GFE, HPIN) is calculated
The A'1=A1 modulo maxResp
Return response XOR A'1
Function F6: F6 (challenge, GFE, Resp_r, secret key):
T2=HMAC(challenge+GFE, secret key) is calculated
The T'2=T2 modulo maxResp
Return the Boolean (T'2==Resp_r). This Boolean takes the value "TRUE" if T'2 and Response_r are equal, and takes the value "FALSE" otherwise.

Life Cycle Management Process

Concerning the life cycle, the processes for the setting up and operational use of the solution have been described (FIGS. 1 and 2), and certain other cases relating to the life cycle remain to be described.

The following case may arise:
loss or forgetting of the PIN code by the user
change of the mobile with keeping of the mobile number
uninstallation of the reliability application by error or accident
change of mobile number
theft or loss of the mobile (and of the associated SIM card)
error on the mobile number at the time of initial registration
intentional stoppage of the service by the user.

Let us deal with first of all with the cases relating to the PIN code: since the present solution does not strictly speaking manage this PIN, the entire life cycle relation to the PIN comes under the application service, as already known. The application service must therefore set up a process relating to the loss and forgetting of the PIN code (resending or re-initialisation of the PIN code). Usually, this problem is moreover dealt with by the application service since the PIN could serve previously as a weak authentication means (with a single factor).

To meet the other cases, two particular processes are defined: re-registration and deregistration of the user.

Figure 4:
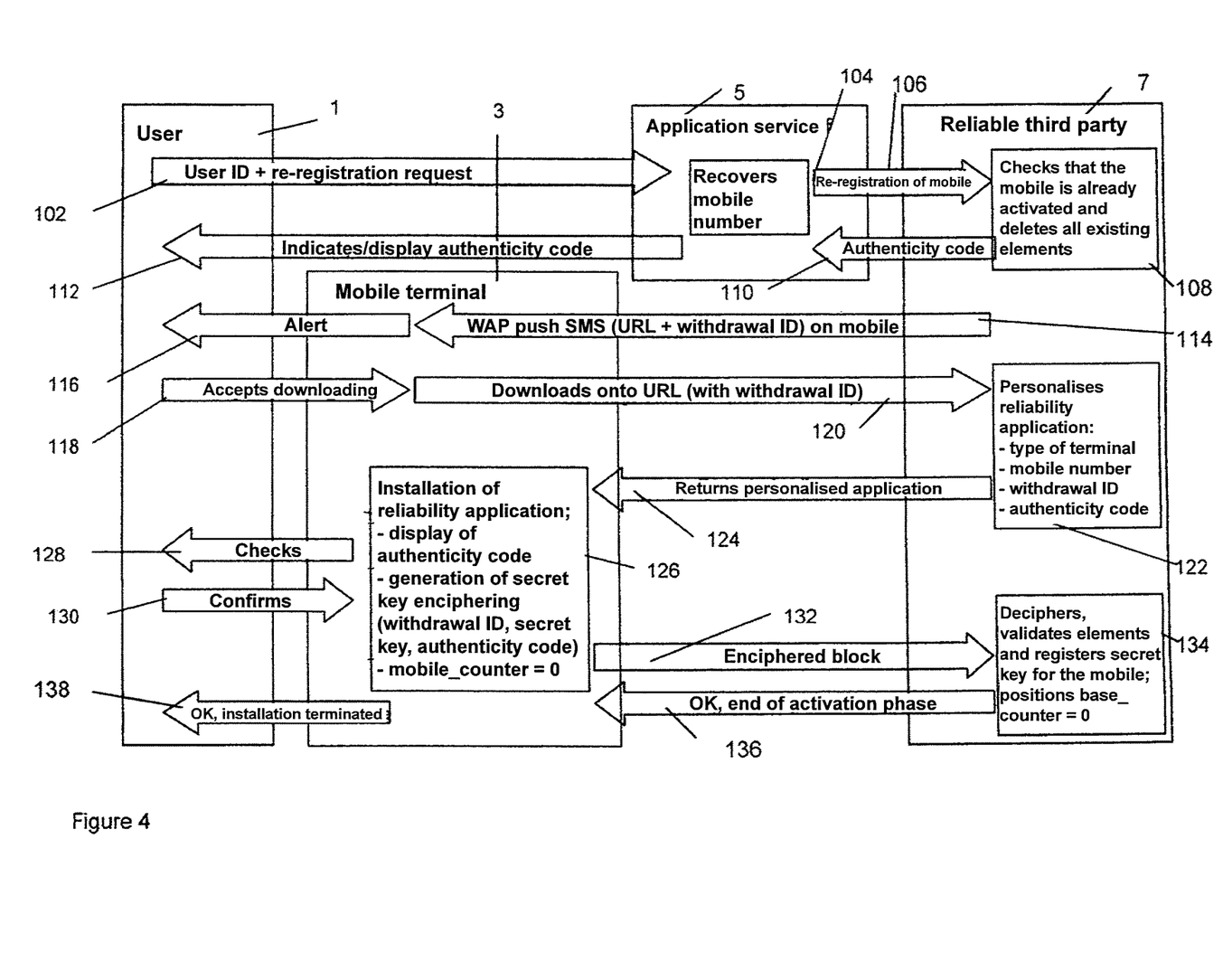
FIG. 4 shows a flow diagram of the method of re-registering a user with the application service, in the case where a previous registration has been compromised.

Re-registration is described with respect to FIG. 4, which is similar to FIG. 1 corresponding to registration. Consequently the same steps have been designated by the same reference numbers.

Re-registration, for a given mobile number, consists of placing the mobile, at the level of the reliable third party, in a state corresponding to the initial registration, as shown schematically by step 108: the secret key is deleted from the server, a new authenticity code is generated (step 10) and communicated to the application service, the mobile_counter is re-initialised (step 26), and an SMS of the WAP push type comprising a new withdrawal ID is sent (step 14) to the mobile in order to trigger a re-installation. Only the mobile number is not deleted from the reliability server.

Figure 5:
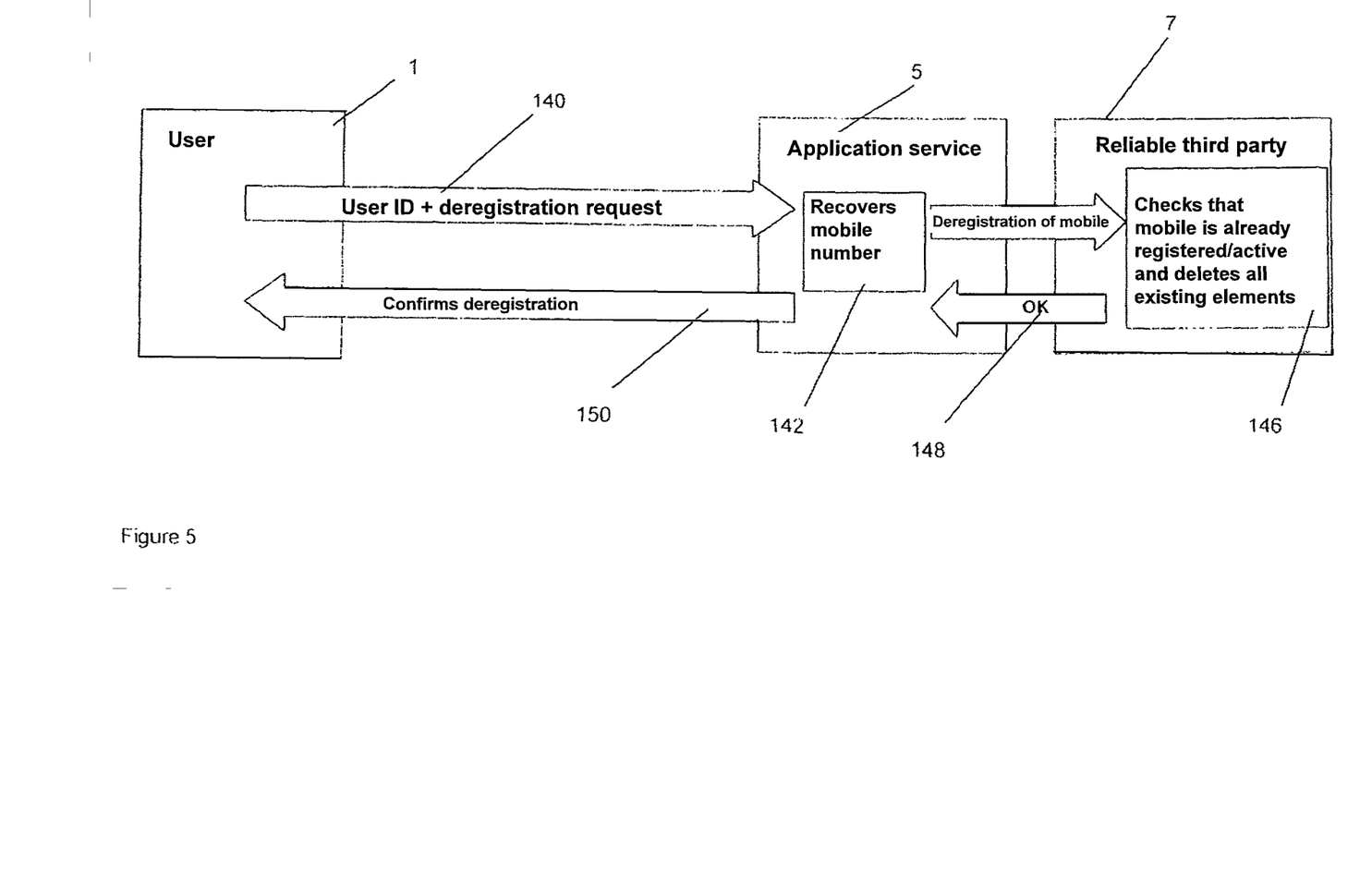
FIG. 5 shows a flow diagram of a method of deregistration of a user with an application service.

Deregistration is described with respect to FIG. 5. It consists, for a given mobile number transmitted by the application service (step 144), of deleting from the server of the reliable third party all the data relating to the mobile (step 146). The latter is then once again in an unknown and non-registered state.

It should be noted that the possession of the mobile on which the reliability application is installed and activated makes it possible to draw OTPs that are valid provided that the PIN entered is the correct one and as long as the reliable third party has not received a request for re-registration or deregistration.

However, attention must be paid to the fact that a request for re-registration may be successful if the mobile is still provided with a SIM card and the mobile number is still active for this SIM card. In the event of loss or theft of the SIM card, it is therefore recommended to request deregistration. For other cases, re-registration may suffice, and avoids having to go through the registration phase again (a cumbersome process since it is necessary to supply the mobile number to the application service in a reliable manner).

Starting from this, it is possible to propose the following rules concerning the process to be adopted according to circumstances:

| Reason | Action |
| --- | --- |
| Loss, forgetting of PIN code | To be dealt with with the application service |
| Change of mobile with keeping of mobile number | Re-registration |
| De-installation of the reliability application by error or accident | Re-registration |
| Change of mobile number | Registration of new mobile number Optionally (if the user no longer has access to the old mobile number): Deregistration of old mobile number |
| Theft or loss of mobile (and of the associated SIM card) | Deregistration |
| Error on mobile number at initial registration | Deregistration, followed by registration |
| Intention stoppage of service by the user | Deregistration |

It should be noted that, in the above description, the reliability application is stored in a memory of the mobile. In a variant embodiment of the invention, it is nevertheless possible to install the reliability application on the SIM (standing for "Subscriber Identity Module") card of the mobile, where it can then be executed.

ADVANTAGES OF THE INVENTION

The invention makes it possible to respond to the aims sought, by proposing a method of strong authentication and signature with an application server, based on the use of two independent factors, namely a PIN code of the user under the responsibility of the application service, as already known in the prior art, and the mobile of the user provided with a reliable application and a secret key, these two elements being under the responsibility of a reliable third party.

The prior art provides for the use of an application and a secret in the mobile of the user but, as already mentioned, questions remain in suspense:

where does the secret come from and how is it protected? how to ensure the integrity of the application?

The registration process in the activation phase of the present invention provides for the secret key fulfilling the generic role of the secret mentioned to be drawn randomly by the reliability application and then communicated to the reliable third party, enciphered by a public key of the reliable third party. Provided that the integrity of the reliability application is ensured (which is the subject matter of the following question), any interception of the secret key during communication thereof to the reliable third party is thus prevented. Moreover, compliance with the MIDP 2.0 standard or equivalent enables the reliability application to store data on the mobile while in principle preventing any access to anyone outside the reliability application itself (despite everything a risk, at least theoretical, of access to these data by acting at the level of the operating system of the mobile should be noted: this will be returned to later, evoking the risk of "cloning").

The integrity of the reliability application is ensured in the context of the present invention by virtue of the following features:

it remains possible to install an application capable of attempting to fulfil the role of reliability application but the latter will not make it possible to usurp the identity of the user through ignorance of the secret key; in addition, assuming that the installation of such a malevolent application occurs when the mobile of the user has been declared to the reliable third party and before activation of the reliability application by the user: the malevolent application installed in place of the reliability application will not be able to have the secret key accepted at the reliable third party through ignorance of the withdrawal ID (communicated solely to the mobile of the user by WAP push SMS or equivalent) and/or of the authenticity code (communicated to the user via the application service, and therefore via a channel other than the mobile).

after installation and activation and unless it is signed by the reliable third party, it is no longer possible to modify the reliability application other than by deletion and replacement of the application (security contribution of the MIDP 2.0 Java standard), but in this case the secret key is deleted, which has the effect of making this new application inoperative vis-à-vis the reliable third part.

Among the other questions relating to the prior art, the requirement for non-repudiation can be noted.

The sharing of responsibility between the application service or services and the reliable third party provided for by the present invention guarantees that no party can be in a "judge and party" position:

neither an application service that certainly knows the PIN (or the HPIN) of each of its users, since it will not be able to know the secret key necessary for generating the OTP or signatures (in fact, even a brute-force attack will not enable it to deduce the secret key from observations of OTPs and/or signatures); moreover, as with anyone, an application service is not in a position to attack the integrity of the reliability application (modification of the reliability application would have made it possible to recover the secret key directly and the installation of a false reliability application would have made it possible to proceed with activation and therefore to recover the secret key indirectly)

nor the reliable third party who certainly knows the secret key of each of the users since he will not be able to know the PIN (or HPIN) of them with the various application services (this is because he does not directly receive the OTPs and the signatures produced by the reliability application, he receives only a reduced form of these data where precisely the influence of the PIN will have been deleted); it is assumed nevertheless that the reliable third party will not be able to permit himself to install a reliability application deliberately comprising a concealed door and thus demonstrably deceive the trust put in him, the application services having a right of audit.

By virtue of these characteristic elements, the invention affords an authentication solution capable of resisting any attempts at improper dispute by users. It can be seen that the invention affords a real impermeability between the data managed respectively by the application services and the reliable third party: this gives real independence between the two authentication factors.

To support the signature function, it has been seen that it was necessary to guarantee that "what you sign is what you see".

One of the aspects of the present invention provides for the sending by the reliable third party of an SMS to the mobile of the signatory user, this SMS comprising a GFE and a challenge. The reliability application presents the GFE to the user, who signs by entering his PIN, the reliability application then generating the signature or technically the response to the challenge. This gives an effective solution to the requirement of "what you sign is what you see". This is because, even if anyone can send an SMS to the signatory user:

either the reliability application is activated and takes over the processing but on the one hand the user will accept signing only if he validates the GFE presented, which therefore prevents having just anything signed unknown to the user, and on the other hand, if the SMS is not sent by the reliable third party, there is no chance of generating a valid signature since the challenge positioned by the reliable third party and sent by SMS solely to the mobile of a user is not then known or another application is activated thereby: even should this be malevolent, it will not be able to generate a valid signature since it does not have access to the secret key.

Let us return here to the theoretical risk of "cloning" of the reliability application.

It will be realised that a reliability application cloned with its data, in particular the secret key, on a mobile other than that of the legitimate user will not despite everything be able to succeed in generating a valid signature: the challenge is in fact necessary and it is sent by SMS by the reliable third party only to the mobile of the user (in fact, the mobile of the user is the one that contains his SIM card and this is not clonable).

Finally, on a practical level and not only with regard to the security of the method, it can be seen that the present invention has the advantage of being easy to deploy. This is because, by means of limited adaptations, it is possible to reinforce a pre-existing authentication system with a single authentication factor (a password) by transforming it into an authentication system with two factors according to the present invention, and this while preserving the registration already made of the users ("know your customer" with attribution of an identifier and a password). To do this, it suffices for the application service managing the initial authentication system:

to subscribe to the reliable third party while adapting its data processing a little and to complete the registration of the users implementing the registration method for the mobile registration phases.

In this context, it is nevertheless recommended that the application services obliges its users to renew their passwords (which on this occasion become PINs) since the old passwords may have been previously compromised.

It should be noted that several different and independent application services, and therefore potentially managed by different companies, may very well each on their part reinforce their pre-existing authentication system as indicated above, without conflicts between them:

the first application service that registers the mobile of a user with the reliable third party causes the installation and activation of the reliability application in the mobile of the user, the following benefit directly from the installation and activation already done.

Finally, it should be emphasised that, in a variant of the present invention, the reliability application can be installed in the SIM card of the user, which then affords further increased security. However, this is not essential to achieve broadly sufficient security (there is no "absolute security") and without directly using the SIM card a solution deployable in total independence of the mobile telephony operators is thus obtained.

The invention claimed is:

1. A method for the two-factor authentication of a user with an application service executed on an application server, wherein the first authentication factor is a personal identification number ("PIN") authentication code known only to the user and the application service, and the second authentication factor is a mobile communication terminal of the user on which is installed a reliability application obtained from a reliable third party or certified by the reliable third party, said reliability application generating, using said PIN authentication code and a secret key shared only with the reliable third party, a single-use authentication code for each authentication of the user with the application service, wherein the authentication of the user with the application service comprises the following steps:

following the entry of the PIN authentication code by the user, generating the single-use authentication code by means of the reliability application installed on the mobile communication terminal of the user using the PIN authentication code and the secret key shared only with the reliable third party;

communicating the single-use authentication code obtained to the application service;

transmitting by the application service of the single-use authentication code in a reduced form to the reliable third party;

verifying the single-use authentication code by the reliable third party;

notifying of the result of the authentication by the reliable third party to the application service;

wherein the method further comprises, prior to the authentication of the user, registering the user with the server of the reliable third party, said registration comprising the steps of:

registering the user with the server of the reliable third party;

downloading and installing the reliability application in the mobile communication terminal;

activating said reliability application in order to make said reliability application functional for subsequent operations of authentication of the user with the application server, wherein the registration phases up to the activation of the user with the reliable third party are performed via the application service and comprise the following steps:

the user declaring a mobile number of the mobile communication terminal of the user to the application service;

requesting by the application service the registration of the user with the reliable third party by communicating to the reliable third party the mobile number of the user;

allocating an authenticity code to the user by the reliable third party followed by a step of sending the authenticity code to the application service;

communicating the authenticity code to the user by the application service;

sending by the reliable third party of a Short Message Service ("SMS") message to the user, said SMS message containing parameters for loading and installing the reliability application on the mobile communication terminal;

loading and installing the reliability application on the mobile communication terminal of the user;

activating the reliability application after verification of the authenticity code;

generating the secret key by the reliability application;

transmitting securely the secret key and of said parameters to the server of the reliable third party;

verifying the secret key and the parameters received by the reliable third party and initializing of the registration of the user;

sending by the reliable third party of a message of confirmation of the activation to the reliability application, wherein the activation of the reliability application is executed at the time of the first execution of the reliability application and comprises the following steps:

displaying of the authenticity code on the screen of the mobile communication terminal for verification by the user of conformity thereof with the authenticity code displayed during the mobile communication terminal registration step;

in response to receiving by the mobile communication terminal a confirmation by the user of agreement of the authenticity code displayed with the authenticity code expected;

generating the secret key by the reliability application;

constructing a message, from a withdrawal identifier, of the secret key and the authenticity code;

enciphering of said message by means of the public key of the reliable third party;

positioning to zero of a single counter of single-use passwords of the mobile communication terminal;

transmitting the message that is enciphered to the server of the reliable third party;

in response to the reception of the message by the server of the reliable third party, deciphering of said enciphered message, using a private key of the reliable third party, so that to extract the secret key generated in the mobile communication terminal and to share the secret key between the reliability application and the server of the reliable third party;

verifying the authenticity code extracted from the deciphered message;

positioning to zero of a counter for the single-use passwords at the server of the reliable third party;

transmitting to the mobile communication terminal of a message of correct completion of the activation of the reliability application.

2. An authentication method according to claim 1, wherein the first authentication factor, namely the PIN authentication code, is supplied to the user by the application service in a secure manner.

3. An authentication method according to claim 1, wherein the first authentication factor, namely the PIN authentication code, is chosen by the user and communicated to the application service in a secure manner.

4. An authentication method according to claim 1, wherein the secret key is created by the reliable third party and communicated to the reliability application in a secure manner.

5. An authentication method according to claim 1, wherein the secret key is generated by the reliability application and communicated to the reliable third party in a secure manner.

6. An authentication method according to claim 1, wherein the reliability application is loaded and installed in a memory of the mobile communication terminal, to make the reliability application executable by a microprocessor of the mobile communication terminal.

7. An authentication method according to claim 1, wherein the reliability application is loaded and installed in a memory of a SIM card, to make the reliability application executable by the microprocessor of the SIM card or of the mobile communication terminal.

8. An authentication method according to claim 1, wherein the authentication of the user by means of the second authentication factor comprises:

the user launching on the user mobile communication terminal the previously activated reliability application and entering the user PIN code on said mobile communication terminal;

calculating the single-use authentication code in the mobile communication terminal by means of the reliability application, and then displaying the single-use authentication code calculated on the screen of the mobile communication terminal;

requesting the user to enter at the application server a user identifier and the single-use authentication code calculated;

at the application server, recovering the mobile number and a value calculated according to a hash function of the PIN authentication code (HPIN) from an identifier stored by the user, and then calculating a reduced password and transmitting the mobile number and the reduced password to the server of the reliable third party;

at the server of the reliable third party, calculating an increment value and then incrementing the value of said counter of the calculated increment value, and then returning to the application server a signal OK if the increment is greater than zero, or a signal NOT OK in the contrary case;

at the application server, if the signal received from the server of the reliable third party is OK, notifying the user that authentication with the application service is successful, and in the contrary case notifying the user that authentication has failed and refusing the user access to the application service.

9. An authentication method according to claim 8, wherein the single-use authentication code is calculated according to a function of the PIN authentication code or H(PIN), of the counter of the mobile communication terminal and of the secret key shared with the server of the reliable third party.

10. An authentication method according to claim 9, wherein the reduced password is calculated according to a function of HPIN and of the single-use authentication code.

11. An authentication method according to claim 9, wherein the increment value is calculated according to a function of the value of the counter of the server of the reliable third party, of the secret key and of the reduced password.

12. An authentication method according to claim 1, wherein a signature of a transaction between the application server and the user previously registered and authenticated with said application server further comprising the following steps:

preparing, at the application server, a "good for execution" (GFE) representing the transaction to be signed, followed by the transmission of the GFE and the mobile number to the server of the reliable third party, wherein the GFE comprises essential data on which the user has been requested to commit;

generating a random challenge at the server of the reliable third party, and then preparing and sending the GFE and the challenge to the mobile communication terminal of the user;

after acceptance of the GFE by the user and entry of the user PIN code, calculating, at the reliability application, a response to the sending of the GFE by the reliable third party;

after entry of the response by the user on the application service, calculating by the application server of a reduced response;

transmitting by the application server of the mobile number and of the reduced response previously calculated, to the server of the reliable third party;

at the server of the reliable third party, calculating of a result and, according to a value of said result indicating to the application service whether or not the user has validly signed the GFE.

13. An authentication method according to claim 12, wherein said response to the sending of the GFE by the reliable third party is calculated by the reliability application according to a function of the GFE, the challenge, the PIN, and the secret key.

14. An authentication method according to claim 12, wherein said reduced response is calculated by the application service according to a function of HPIN, the GFE and said response.

15. An authentication method according to claim 12, wherein said result is a Boolean function of the challenge, of the secret key and of the reduced response.

* * * * *